United States Patent
Ralph et al.

(10) Patent No.: US 7,719,736 B2
(45) Date of Patent: May 18, 2010

(54) COMPONENTS FOR OPTICAL QUBITS IN THE RADIO FREQUENCY BASIS

(75) Inventors: Timothy Cameron Ralph, Indooroopilly (AU); Elanor Huntington, Ngunnawal (AU)

(73) Assignee: Qucor Pty Ltd. A.C.N., Sydney (AU)

( * ) Notice: Subject to any disclaimer, the term of this patent is extended or adjusted under 35 U.S.C. 154(b) by 432 days.

(21) Appl. No.: 10/577,799

(22) PCT Filed: Oct. 27, 2004

(86) PCT No.: PCT/AU2004/001476

§ 371 (c)(1),
(2), (4) Date: Nov. 28, 2006

(87) PCT Pub. No.: WO2005/043787

PCT Pub. Date: May 12, 2005

(65) Prior Publication Data

US 2007/0070353 A1    Mar. 29, 2007

(30) Foreign Application Priority Data

Oct. 29, 2003    (AU) .............................. 2003905969

(51) Int. Cl.
G06E 3/00      (2006.01)
G01B 9/02      (2006.01)
(52) U.S. Cl. ...................... 359/107; 356/450; 356/484
(58) Field of Classification Search ................... 359/107
See application file for complete search history.

(56) References Cited

U.S. PATENT DOCUMENTS

| 6,430,345 B1 | 8/2002 | Dultz et al. |
| 6,438,234 B1 * | 8/2002 | Gisin et al. ................. 380/256 |
| 6,552,800 B1 * | 4/2003 | Wright et al. ............... 356/497 |
| 2002/0140941 A1 | 10/2002 | Pedigo |
| 2003/0169880 A1 | 9/2003 | Nambu et al. |
| 2003/0231826 A1 * | 12/2003 | Boyd et al. .................... 385/27 |

FOREIGN PATENT DOCUMENTS

WO    WO 03/019283 A2    3/2003

OTHER PUBLICATIONS

International Search Report for PCT/AU2004/001476 dated Jan. 12, 2005.

* cited by examiner

Primary Examiner—Arnel C Lavarias
Assistant Examiner—Jade R Callaway
(74) Attorney, Agent, or Firm—Locke, Lord, Bissell & Liddell LLP

(57) ABSTRACT

In the field of optical quantum information processing, manipulation of single photon qubits in frequency modes employs a frequency beamsplitter employs an asymmetric two-path interferometer, reversible down to the quantum limit. A first partially transmitting mirror splits photons into first and second paths. A time delay element introduces a differential time delay into the second path. And a second partially transmitting mirror mixes the two paths again to form two outputs. A half-wave plate utilizes two of the beam splitters.

11 Claims, 4 Drawing Sheets

Fig. 1(a) Fig. 1(b)

COMPONENTS FOR OPTICAL QUBITS IN THE RADIO FREQUENCY BASIS

TECHNICAL FIELD

The invention is in the field of optical quantum information processing. This invention concerns the manipulation of single photon qubits in frequency modes, and in particular a frequency beamsplitter and a frequency half-wave plate for use in the frequency basis.

BACKGROUND ART

Quantum information operations may be performed by assigning logical states to the quantum states in physical systems. The logical states are analogous to the zero and one states for a conventional digital computer. Quantum information can be encoded and manipulated using single photon states. Many in principle demonstrations of quantum information tasks have now been accomplished in single photon optics including quantum cryptography [1], quantum dense coding [2] and quantum teleportation [3]. More recently two qubit gates have been realised [4,5] using conditional techniques [6]. Such experiments typically make use of polarisation to encode the qubits.

The tools used in polarisation encoding schemes are principally the half-wave plate which is used to make arbitrary rotations of a state in the polarisation basis, the polarising beamsplitter which is used to separate (or combine) photons into (from) different spatial and polarisation modes and the quarter-wave plate which is used to introduce relative phase shifts between the two bases.

It will be appreciated that polarisation is not the only photonic degree of freedom available to the experimentalist. For example schemes in which the temporal [7] or spatial [8] optical modes form the quantum basis have also been realised. Here we consider a basis consisting of two frequency optical modes.

DISCLOSURE OF THE INVENTION

In a first aspect the invention is a frequency beamsplitter for use in the frequency basis, comprising: An asymmetric two-path interferometer, reversible down to the quantum limit. A first partially transmitting mirror to split photons into first and second paths. A time delay element to introduce a differential time delay into the second path. And a second partially transmitting mirror to mix the two paths again to form two outputs.

Such a frequency beamsplitter separates two frequency modes on a single optical beam into two spatially separated beams using standard optical elements.

Suitable interferometers include the Mach-Zehnder interferometer, a Michelson interferometer or any other interferometer with a frequency dependent phase shift.

An optical qubit can be encoded in the occupation by a single photon of one of two different frequency modes These frequencies would ideally be sufficiently close together that they can be manipulated with standard electro-optical devices but still be clearly resolvable using narrowband optical and opto-electronic systems.

The beam splitter may also be implemented using commercial optical fibre or planar waveguide technologies. Hence, such an encoding scheme is attractive from the perspective of developing stable, robust and ultimately commercially viable optical quantum information systems.

The attraction of optical fibre based quantum optical systems is clear. For example, there is ongoing interest in developing non-classical optical sources that will be well suited to optical fibres and optical fibre technologies [9-11]. Indeed a Quantum Key Distribution (QKD) scheme using radio frequency amplitude and phase modulation as the conjugate bases has recently been demonstrated using optical fibres and fibre technologies [12].

In free space, additional mirrors may be provided between the partially transmitting mirrors or at the output to redirect the first and second paths to provide the outputs at convenient locations. Optical fibre or planar waveguide structures may perform similar functions.

In a second aspect the invention is a radio frequency half-wave plate for use in the frequency basis, comprising: A frequency beamsplitter as defined above to split a beam of photonic qubits encoded in different frequency modes. An acousto-optic modulator driven to receive the outputs from the frequency beamsplitter and couple the two different frequency and spatial modes of the outputs together via a phonon interaction to produce two further outputs. A frequency beamsplitter as defined above operating in reverse to receive the two further outputs from the acousto-optic modulator and produce a combined output.

Such a device is able to produce any selected rotation of photonic qubits in the radio frequency basis.

It should be appreciated that in the frequency basis relative phase shifts, that is quarter wave plate (QWP) action, is naturally achieved during propagation.

In summary, the invention provides devices which may be used as the principle experimental components in optical quantum information systems which make use of the frequency basis. These components are essentially the frequency basis analogues of the polarising beamsplitter and the half-wave plate. They allow arbitrary, reversible operations to be performed on frequency basis encoded qubits.

BRIEF DESCRIPTION OF THE DRAWINGS

An example of the invention will now be described with reference to the accompanying drawings, in which.

BEST MODES OF THE INVENTION

Figure 1C:
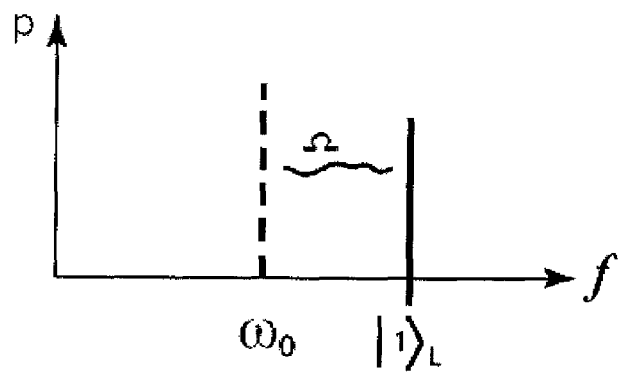
FIG. 1(*a*) is a graph illustrating $|1\rangle_L$, FIG. 1(*b*) is a graph illustrating $|0\rangle_L$ and FIG. 1(*c*) is a graph of the sum of $|1\rangle_L$ and $|0\rangle_L$, namely
Figure 1C:
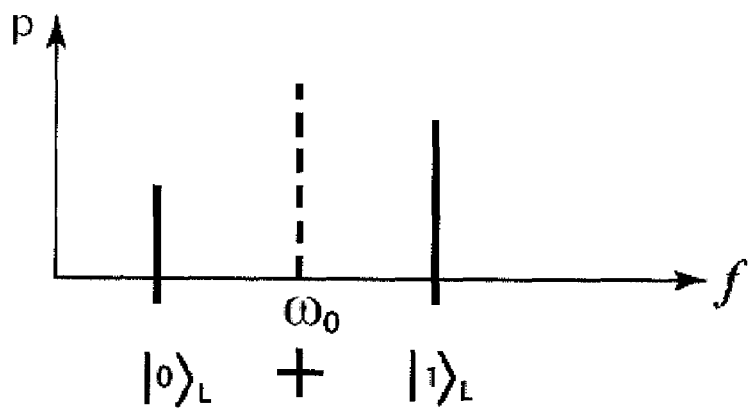

Referring first to FIGS. 1(*a*) and (*b*) to illustrate the physics of the invention, we first present an idealized example of an encoding scheme which makes use of the radio frequency basis. Consider the logical basis whereby $$|0\rangle_L = |1\rangle_{-\Omega}|0\rangle_{+\Omega}$$

$$|1\rangle_L = |0\rangle_{-\Omega}|1\rangle_{+\Omega} \quad (1)$$

where $|0\rangle_L$ and $|1\rangle_L$ denote the logical states of the qubit and the notation $|n\rangle_{\pm\Omega}$ denotes an n photon state at the frequency $\pm\Omega$ relative to the average or carrier frequency $\omega_0$. We shall assume that the states are indistinguishable apart from their frequencies. Given current technical considerations, $\Omega$ is taken to be a radio or microwave frequency in the range of tens of megahertz to a few gigahertz. It is convenient to write the states of Eq. 1 in the form $$|0\rangle_L = A(-\Omega)^\dagger |0\rangle$$

$$|1\rangle_L = A(-\Omega)^\dagger |0\rangle \quad (2)$$

where $A(\omega)^\dagger$ is the creation operator for the $\omega$ frequency mode. As all the elements in our device are passive (energy conserving) we can obtain the state evolution produced through the device by considering the Heisenberg evolution of the relevant operators.

Figure 2:
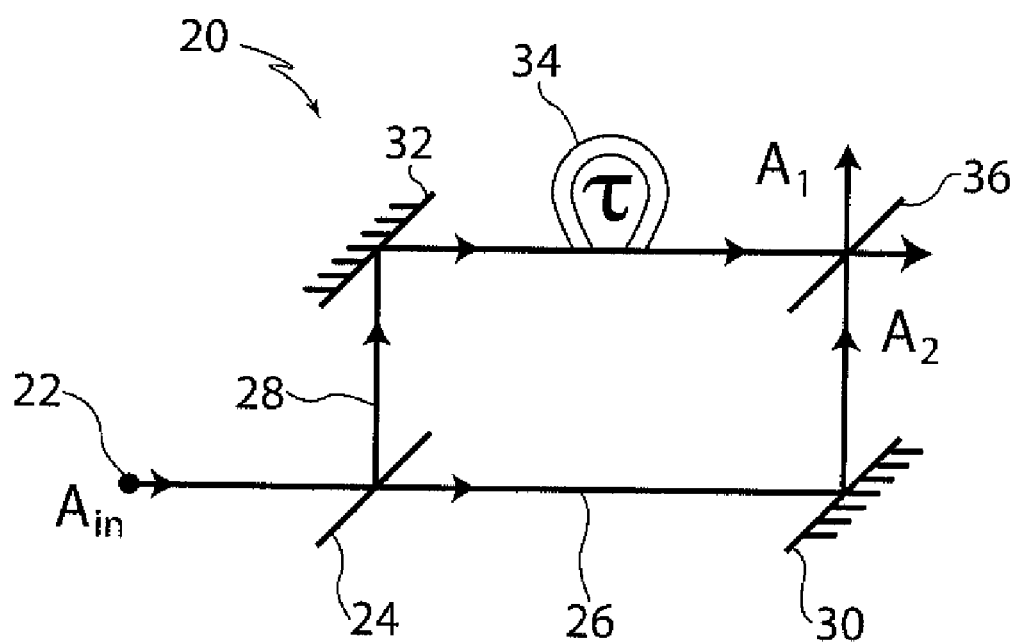
FIG. 2 is a schematic diagram of a radio frequency beamsplitter.

FIG. 2 is a schematic diagram of a radio frequency beamsplitter 20 comprising a highly asymmetric Mach-Zehnder interferometer. This is arranged with an input port 22 to receive a radio frequency input signal $A_{in}$. The arrow indicates directions of propagation of internal optical fields. A first partially transmitting mirror 24 which splits the optical input $A_{in}$ into first 26 and second 28 paths. First 30 and second 32 mirrors redirect the first 26 and second 28 paths. In the second path 28 there is a time delay element 34 to introduce a differential time delay $\tau$ into the second path. The two paths are then mixed again at a second partially transmitting mirror 36 to form two outputs $A_1$ and $A_2$.

The annihilation operators for the forward traveling outputs of the Mach-Zehnder interferometer at the frequency $\omega$ may be written as $$A_1(\omega) = \frac{1}{2}[A_{in}(\omega)(-e^{i\phi}e^{i\omega\tau}+1) + \iota v_{in}(\omega)(e^{i\phi}e^{i\omega\tau}+1)] \quad (3)$$

$$A_2(\omega) = \frac{1}{2}[\iota A_{in}(\omega)(e^{i\phi}e^{i\omega\tau}+1) + v_{in}(\omega)(e^{i\phi}e^{i\omega\tau}-1)]$$

where $A_1$ and $A_2$ are defined in FIG. 1, $\tau$ is the differential time delay introduced into one of the arms of the interferometer and $\phi = \omega_0 \tau$ is the phase shift acquired by a field at the carrier frequency.

Choosing the time delay $\tau$ in the interferometer such that $\phi = \pi/2$ and $\Omega\tau = \pi/2$, the creation operators for the forward travelling outputs of the Mach-Zehnder interferometer at the frequencies $\omega = \pm\Omega$ are $$A_1(\Omega)^\dagger = A_{in}(\Omega)^\dagger, \quad A_1(-\Omega)^\dagger = -\iota v_{in}(-\Omega)^\dagger$$

$$A_2(\Omega)^\dagger = v_{in}(\Omega)^\dagger, \quad A_1(-\Omega)^\dagger = -\iota A_{in}(-\Omega)^\dagger$$

In the state picture we have that an arbitrary input state $$51 \ \psi\rangle = (\mu A_{in}(-\Omega)^\dagger + v A_{in}(\Omega)^\dagger)|0\rangle_{Ain}|\rangle_{vin} \quad (4)$$

is transformed to the output state $|\psi'\rangle$ according to $$|\psi'\rangle = U|\psi\rangle \quad (5)$$
$$= U(\mu A_{in}(-\Omega)^\dagger + v A_{in}(\Omega)^\dagger)|0\rangle_{Ain}|\rangle_{vin}$$
$$= (\mu U A_{in}(-\Omega)^\dagger U^\dagger + v U A_{in}(\Omega)^\dagger U^\dagger)|0\rangle_{A1}|0\rangle_{A2}$$
$$= (\mu A_2(-\Omega)^\dagger + v A_1(\Omega)^\dagger |0\rangle_{A1}|0\rangle_{A2}$$
$$= \iota \mu |0\rangle_{A1}|1\rangle_{-\Omega,A2} + v|1\rangle_{+\Omega,A1}|0\rangle_{A2}$$

where U is the unitary operator representing the evolution through the element. In going from lines two to three we have used the fact that $U A_{in}(-\Omega)^\dagger U^\dagger$ is time reversed Heisenberg evolution, obtained explicitly by inverting the standard Heisenberg equations such that the input operator is written in terms of the output operators. We have also used $U|0\rangle_{Ain}|0\rangle_{vin} = |0\rangle_{A1}|0\rangle_{A2}$. The action on the frequency encoding is equivalent to the action of a polarising beamsplitter in polarisation encoding.

The frequency beamsplitter 20 is used as the first stage of the radio frequency half-wave plate (RF-HWP) 40 which will now be described with reference to FIG. 3.

Figure 3:
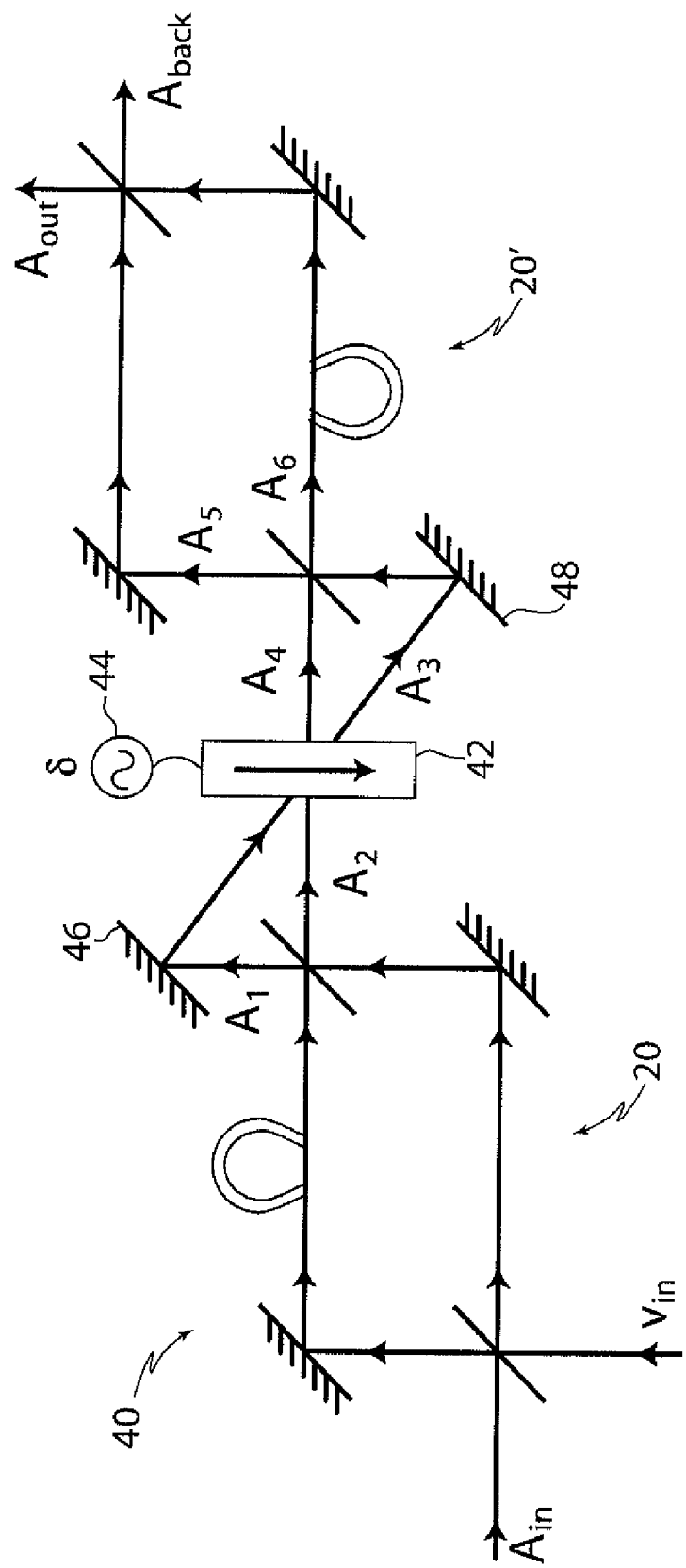
FIG. 3 is a schematic diagram of a radio frequency half-wave plate incorporating the beamsplitter of FIG. 1.

The radio frequency half-wave plate (RF-HWP) 40 of FIG. 3 comprises a first frequency beamsplitter 20 followed by an acousto-optic modulator (AOM) 42, followed by another frequency beamsplitter 20'. The arrow in the AOM 42 indicates the direction of propagation of the acoustic wave in the device. The frequency of the radio frequency source 44 used to drive the AOM is $\delta$.

In the Heisenberg picture, we define the annihilation operator for the input mode at a particular Fourier frequency $\omega$ relative to the carrier as $A_{in}(\omega)$. We also define an ancilla field $\hat{v}_{in}(t)$, initially in a vacuum state, entering the device vertically from the bottom. FIG. 3 defines a number of internal annihilation operators for the RF-HWP as well as two output fields. The output of interest is $A_{out}$.

It can be seen that, in use, output $A_1$ is reflected from a further mirror 46 to a first input port of the AOM, and output $A_2$ also passes into to the second input port of the AOM.

If we take the logical basis as defined in Eq. 1 and 2, we become interested specifically in the operators, $A_k(\Omega)$ and $A_k(-\Omega)$ where k=in, 1 . . . 6, out, back. We shall make use of the relation that $A_k^\dagger(\omega) = A_k(-\omega)^\dagger$ [16] to find the relevant creation operators.

The heart of the RF-HWP is the acousto-optic modulator (AOM) 42 which couples two different frequency and spatial modes together via a phonon interaction [17,18]. In our scheme the AOM is used to shift photons between the two frequencies $-\Omega$ and $\Omega$. The annihilation operators for the outputs of the AOM, $A_3(\omega)$ and $A_4(\omega)$ as defined in FIG. 3, are [17]

$$A_3(\omega) = \cos\theta A_1(\omega) + \iota \sin\theta A_2(\omega-\delta) \quad (6)$$

$$A_4(\omega) = \cos\theta A_2(\omega) + \iota \sin\theta A_1(\omega+\delta) \quad (7)$$

where $\delta$ represents the modulation frequency applied to the AOM and $\theta$ a measure of the diffraction efficiency of the AOM such that $\cos\theta$ represents the undiffracted fraction of the field and $\sin\theta$ represents the diffracted fraction. We have taken the asymmetric phase convention for the AOM outputs and note that $\theta$ is proportional to the amplitude of the radio frequency modulation applied to the AOM [18]. We note that the second term in Eq. 6 represents the diffracted, and hence frequency upshifted, component of the input field $A_2$. Similarly, the second term in Eq. 7 represents the downshifted component of $A_1$.

The output fields $A_3$, after reflection in mirror 48, and $A_4$ pass through the second Mach-Zehnder interferometer. The annihilation operators for the output fields of the system, $A_{out}$ and $A_{back}$, are $$A_{out}(\omega) = \frac{1}{2}[A_4(\omega)(-e^{i\phi_2}e^{i\omega\tau_2}+1) + iA_3(\omega)(e^{i\phi_2}e^{i\omega\tau_2}+1)] \quad (8)$$

$$A_{back}(\omega) = \frac{1}{2}[iA_4(\omega)(e^{i\phi_2}e^{i\omega\tau_2}+1) + A_3(\omega)(e^{i\phi_2}e^{i\omega\tau_2}-1)] \quad (9)$$

where $\phi_2 = \omega\tau_2$ is the phase shift acquired by the "carrier" in the second interferometer with time delay $\tau_2$. We can combine the results of Equations 3, 6 and 7, 8 and 9 as well as making use of $A^\dagger(\omega)=A(-\omega)^\dagger$ to arrive at the creation operators for the outputs of the RF-HWP in terms of the inputs. Focussing on the output $A_{out}$ at the frequencies of interest $\omega=\pm\Omega$, setting the AOM modulation frequency $\delta=2\Omega$ and setting the time delays in both interferometers such that $\phi=\pi/2$, $\phi_2=\pi/2$ and $\Omega\tau=\Omega\tau_2=\pi/2$, we find that $$A_{out}(-\Omega)^\dagger = -i[\cos\theta A_{in}(-\Omega)^\dagger + \sin\theta A_{in}(\Omega)^\dagger$$

$$A_{out}(\Omega)^\dagger = -i[\cos\theta A_{in}(\Omega)^\dagger - \sin\theta A_{in}(-\Omega)^\dagger \quad (10)$$

Applying Eq. 12 to the $|0\rangle_L$ input state leads to $$|\psi\rangle_{0,out} = -[\cos\theta A_{out}(-\Omega)^\dagger - \sin\theta A_{out}(\Omega)^\dagger]|0\rangle_{Aout}|0\rangle_{vout} \quad (11)$$

$$= -(\cos\theta|0\rangle_L - \sin\theta|1\rangle_L)$$

whilst applying it to the $|1\rangle_L$ input gives $$|\psi\rangle_{0,out} = -[\cos\theta A_{out}(\Omega)^\dagger + \sin\theta A_{out}(-\Omega)^\dagger]|0\rangle_{Aout}|0\rangle_{vout} \quad (12)$$

$$= -(\cos\theta|1\rangle_L + \sin\theta|0\rangle_L)$$

Equations 11 and 12 are the key results. Up to a global phase, these equations are formally equivalent to those used to describe the rotation of an arbitrary two dimensional vector through the angle $\theta$. Hence the system illustrated in FIG. 3 is operationally equivalent to a half-wave plate in the basis defined by the frequencies $-\Omega$ and $\Omega$.

Figure 4:
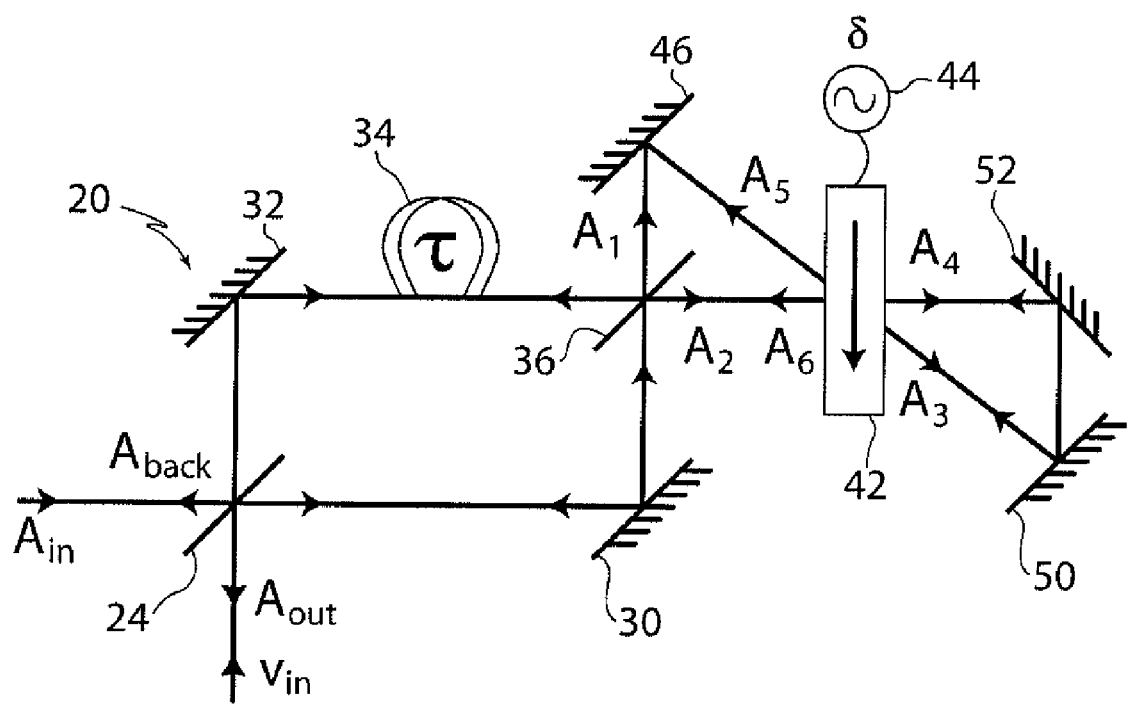
FIG. 4 is a folded form of the radio frequency half-wave plate of FIG. 3.

Let us now turn to technical issues. Conceptually, the RF-HWP comprises a FBS, followed by an AOM followed by another FBS. However, implementing the RF-HWP in such a fashion would be a tremendously challenging technical task. It would require actively locking the phase $\phi=\pi/2$ in two different interferometers. In addition, the optical path length between the two interferometers would need to be locked. This is why we have proposed the RF-HWP with the folded design illustrated in FIG. 4. This folded design requires locking of only one interferometer. Further, a locking signal can be derived from the backward travelling output of the RF-HWP, $A_{back}$, without disturbing the useful output $A_{out}$.

Let us denote the "forward travelling" beams as those propagating to the right of FIG. 1 and the "backward travelling" beams as those propagating to the left.

We double pass the AOM in this scheme by reflecting $A_3$ in mirror 50 and $A_4$ in mirror 52. The two backward travelling fields $A_5$ and $A_6$ emerge from the AOM as illustrated in FIG. 5. The annihilation operators for the backward travelling fields emerging from the AOM are $$A_5(\omega) = \cos\theta A_4(\omega) + i\sin\theta A_3(\omega+\delta) \quad (13)$$
$$= \cos 2\theta A_2(\omega) + i\sin 2\theta A_1(\omega+\delta)$$

$$A_6(\omega) = \cos\theta A_3(\omega) + i\sin\theta A_4(\omega-\delta) \quad (14)$$
$$= \cos 2\theta A_1(\omega) + i\sin 2\theta A_2(\omega-\delta)$$

The backward travelling fields $A_5$ and $A_6$ make a second pass of the Mach-Zehnder interferometer. The annihilation operators for the output fields of the system, $A_{out}$ and $A_{back}$, are $$A_{out}(\omega) = \frac{1}{2}[iA_5(\omega)(e^{i\phi}e^{i\omega\tau}+1) + A_6(\omega)(e^{i\phi}e^{i\omega\tau}-1)] \quad (15)$$

$$A_{back}(\omega) = \frac{1}{2}[A_5(\omega)(-e^{i\phi}e^{i\omega\tau}+1) + iA_6(\omega)(e^{i\phi}e^{i\omega\tau}+1)] \quad (16)$$

where the parameters $\phi$ and $\tau$ are the same as those for the forward travelling asymmetric Mach-Zehnder interferometer.

We can combine the results of Equations 3, 13, 14, 15 and 16 as well as making use of $A^\dagger(\omega)=A(-\omega)^\dagger$ to arrive at the creation operators for the outputs of the RF-HWP in terms of the inputs. Focussing on the downward travelling output $A_{out}$ at the frequencies of interest $\omega=\pm\Omega$, setting the AOM modulation frequency $\delta=2\Omega$ and setting $\tau$ such that $\phi=\pi/2$ and $\Omega\tau=\pi/2$, we find that $$A_{out}(-\Omega)^\dagger = -[\cos 2\theta A_{in}(-\Omega)^\dagger + \sin 2\theta A_{in}(\Omega)^\dagger$$

$$A_{out}(\Omega)^\dagger = -[\cos 2\theta A_{in}(\Omega)^\dagger + \sin 2\theta A_{in}(-\Omega)^\dagger \quad (17)$$

Applying Eq. 19 to the $|0\rangle_L$ input state leads to $$|\psi\rangle_{0,out} = -[\cos 2\theta A_{out}(-\Omega)^\dagger - \sin 2\theta A_{out}(\Omega)^\dagger]|0\rangle_{Aout}|0\rangle_{vout} \quad (18)$$

$$= -(\cos 2\theta|0\rangle_L - \sin 2\theta|1\rangle_L)$$

whilst applying it to the $|1\rangle_L$ input gives $$|\psi\rangle_{0,out} = -[\cos 2\theta A_{out}(\Omega)^\dagger + \sin 2\theta A_{out}(-\Omega)^\dagger]|0\rangle_{Aout}|0\rangle_{vout} \quad (19)$$

$$= -(\cos 2\theta|1\rangle_L + \sin 2\theta|0\rangle_L)$$

Equations 18 and 19 are again the key results. Up to a global phase, these equations are formally equivalent to those used to describe the rotation of an arbitrary two dimensional vector through the angle $\Theta=2\theta$. Hence the system illustrated in FIG. 5 is operationally equivalent to a half-wave plate in the basis defined by the frequencies $-\Omega$ and $\Omega$.

The situation considered so far is of course impractical, as single frequency qubits will be stationary in time. More realistically, we might consider finite bandwidth qubits of the form:

$$|0\rangle_L = \left(\frac{2}{\pi\sigma}\right)^{1/4}\int d\omega e^{-(\Omega+\omega)^2/\sigma}A_{in}(\omega)^\dagger|0\rangle \quad (22)$$

$$|1\rangle_L = \left(\frac{2}{\pi\sigma}\right)^{1/4}\int d\omega e^{-(\Omega-\omega)^2/\sigma}A_{in}(\omega)^\dagger|0\rangle$$

The overlap between these qubits is
$$\langle 0|1\rangle_L = e^{-2\Omega^2/\sigma} \quad (23)$$

thus provided the width of the frequency packet is sufficiently small compared to its mean (i.e $\sigma\ll 2\Omega^2$) then these qubits will be approximately orthogonal. The problem with the finite frequency spread for our device is that now the condition $\Omega\tau=\pi/2$ will not be precisely satisfied for the entire frequency packet. The effect is to produce a phase shift across the frequency wave packet and also to produce some probability of photons exiting the device in the wrong beam (ie $A_{back}$) or at frequencies outside the computational basis (eg $2\Omega$). Taking such events as lost photons and tracing over them leads to a mixed state which can be written $$\rho_{out,i} = |Q\rangle_i \langle Q|_i + |\overline{Q}\rangle\langle\overline{Q}| \quad (24)$$

where $\rho_{out,1}$ represents the mixed state output obtained for the logical state input $|i\rangle_L$. For the $|0\rangle_L$ input state $$|Q\rangle_0 = \quad (25)$$

$$-\left(\frac{2}{\pi\sigma}\right)^{1/4} \int d\omega e^{-(\Omega+\omega)^2/\sigma} \left(\cos 2\theta A_{in}(\omega)^\dagger 1/2(1 + e^{i\pi(\Omega+\omega)/\Omega}) - \sin 2\theta A_{in}(\omega + 2\Omega)^\dagger 1/4(1 + e^{i\pi 2(\Omega+\omega)/\Omega})^2\right)|0\rangle$$

and for the $|1\rangle_L$ input $$|Q\rangle_1 = \quad (26)$$

$$-\left(\frac{2}{\pi\sigma}\right)^{1/4} \int d\omega e^{-(\Omega-\omega)^2/\sigma} \left(\cos 2\theta A_{in}(\omega)^\dagger 1/2(1 + e^{-i\pi(\Omega-\omega)/\Omega}) + \sin 2\theta A_{in}(\omega - 2\Omega)^\dagger 1/4(1 + e^{-i\pi 2(\Omega-\omega)/\Omega})^2\right)|0\rangle$$

and where $|\overline{Q}\rangle$ is a collective ket representing all the photons that end up in (orthogonal) states outside the computational basis. We can evaluate the impact of this effect by calculating the fidelity between the expected output state, $|P\rangle_i$, and that obtained:

$$F = \langle P|\rho_{out,i}|P\rangle_i \quad (27)$$

The expression for the fidelity is complicated and of limited utility to reproduce here, however its pertinent features can be listed succinctly: the fidelity depends strongly on the ratio of $\Omega^2$ to $\sigma$; it depends weakly on the rotation angle $\theta$; as expected it tends to one as the ratio $\Omega^2/\sigma$ tends to infinity. Some representative results are: $\Omega^2/\sigma=10$, F=0.942; $\Omega^2/\sigma=100$, F=0.9939; $\Omega^2/\sigma=1000$, F=0.99938. We conclude that high fidelities are consistent with sensible signal bandwidths.

The technical limitations to the performance of the RF-HWP will be set by the diffraction efficiency of the AOM, the transmission losses of the AOM and the mode-matching efficiency in the interferometer. Rotation of the input through an angle of $\Theta=\pi/2$ requires that the AOM have a diffraction efficiency of 50%. This technical requirement can currently be met with commercially available devices [21]. Transmission losses in the AOM mean that the mode which is redirected into the interferometer, and which is ultimately measured, is actually a mixture of the original mode and the vacuum. This effect may be treated as a perfectly transmitting AOM with a partially transmitting beamsplitter placed on each output port [19,20] Mode mismatch in the interferometer will reduce the fringe visibility at the sideband frequencies. We can model this effect by decomposing all fields into projections onto an orthonormal basis set of spatial modes, and then introducing a rotation of one of the internal fields of the interferometer relative to the other in this vector space. We treat photons which appear in the incorrect spatial modes as lost.

We can evaluate the impact of AOM losses and mode-matching efficiency by calculating the fidelity between the expected output state and that actually obtained at the output of the RF-HWP. The fidelity after taking account of AOM losses and mode-matching efficiency, F' is $$F' = F\left(\frac{\eta_{AOM}}{4}\left[2(1+\eta_{mm})\cos^2(2\theta) + \left(1+\sqrt{\eta_{mm}}\right)^2\sin^2(2\theta)\right]\right)^2, \quad (28)$$

where the single-pass power transmission in the AOM is given by $\eta_{AOM}$ and the single-pass mode-matching efficiency of the interferometer is given by $\eta_{mm}$. The fidelity of the system in the absence of technical limitations is given by F. A good quality free-space AOM would have $\eta > 0.95$ [21]. Similarly, a well mode-matched interferometer would have $\eta_{mm} > 0.95$ [22]. We note in passing that detector efficiency or homodyne mode-matching efficiency may be modeled in the same way as losses in the AOM Suitable interferometers include the Mach-Zehnder interferometer, a Michelson interferometer or any other interferometer with a frequency dependant phase shift.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

REFERENCES

[1] W. T. Buttler et al, Phys. Rev. A 57, 2379 (1998).
[2] K. Mattle, H. Weinfiuter, P. G. Kwiat, and A. Zeilinger Phys. Rev. Lett. 76, 4656-4659 (1996).
[3] D. Bouwineester, J. W. Pan, K Mattle, M. Eibl, H. Weinfiurter and A. Zeilinger, Nature 390, 575 (1997).
[4] T. B. Pittman, B. C. Jacobs, J. D. Franson, Phys. Rev. Lett., 88, 257902 (2002); T. B. Pittman, M. J. Fitch, B. C. Jacobs and J. D. Ranson, quant-ph/030311.3 (2003).
[5] J. L. O'Brien, G. J. Pryde, A. G. White, T. C. Ralph and D. Branning, submitted (2003).
[6] E. Knill, R. Laflamme, and G. J. Milburn, Nature, 404, 48 (2001).
[7] H. Zbinden et al, Appl. Phys. B 67, 743 (1998).
[8] E. Lombardi, F. Sciartino, S. Popescu, and F. De Martini Phys. Rev. Lett. 88, 070402 (2002)
[9] M. Fiorentino, P. L. Voss, J. E. Sharping, and P. Kumar, IEEE Ph Technol. Lett., 14, 983 (2002).
[10] J. E. Sharping, M. Fiorentino, P. Kumar, Opt. Lett., 26, 367 (2001)
[11] C. Silberhorn, P. K. Lam, O. Weiss, F., Konig, N. Korolkova, G. Leuchs, Phys. Rev. Lett., 86, 4267 (2001).
[12] J.-M. Merolla, L. Duraffourg, J.-P. Goedgebuer, A. Soujaeff, F. Patois, and W. T. Rhodes, Eur. Phys. J. D, 18, 141 (2002).
[13] E. H. Huntington and T. C. Ralph J. Opt. B 4, 123 (2002).
[14] J. Zhang and S. L. Braunstein, Phys. Rev. A, 67, 054302 (2003)
[15] D. F. Walls, and G. J. Milburn, Quantum Optics, Springer, Berlin (1995).
[16] R. J. Glauber, Phys. Rev., 130, 2529 (1963).
[17] K. J. Resch, S. H. Myrskog, J. S. Lundeen, and A. M. Steinberg, Phys. Rev. A, 64, 056101 (2001).
[18] E. H. Young, S.-K. Yao, Proc. IEEE, 69, 54 (1981).
[19] F. Grosshans and P. Grangier, Eur. Phys. J D 14, 119 (2001)
[20] A. I. Lvovsky, H. Hansen, T. Aichele, O. Benson, J. Mlynek and S. Schiller, Phys. Rev. Lett., 87, 050402 (2001).

[21] See for example http://www.brimrose.com
[22] B. C. Buchler, P. K. Lam, H-A. Bachor, U. L. Andersen, and T. C. Ralph, Phys. Rev. A 65, 011803 (2002)

The invention claimed is:

1. A frequency beamsplitter for use in the frequency basis, to receive input photons and produce output photons separated in frequency space, the frequency beamsplitter comprising: an asymmetric two-path interferometer, reversible down to the quantum limit, arranged with a first partially transmitting mirror to split input photons into first and second paths, a time delay element to introduce a differential time delay into the second path, and a second partially transmitting mirror to mix the two paths again to form two outputs respectively delivering photons at different frequencies separated in the frequency space by a radio or microwave frequency determined by the time delay.

2. A frequency beamsplitter according to claim 1, wherein the interferometer has a frequency dependent phase shift.

3. A frequency beamsplitter according to claim 2, wherein the interferometer is a Mach-Zehnder interferometer.

4. A frequency beamsplitter according to claim 2, wherein the interferometer is a Michelson interferometer.

5. A frequency beamsplitter according to claim 1, wherein, additional mirrors are provided between the partially transmitting mirrors or at the output to redirect the first and second paths to provide the two outputs at convenient locations.

6. A frequency beamsplitter according to claim 1, comprising mirrors and a time delay implemented using optical fibre structures.

7. A frequency beamsplitter according to claim 1, comprising mirrors and a time delay implemented using planar waveguide structures.

8. A frequency beamsplitter according to claim 1, arranged to operate with single photons.

9. A radio frequency half-wave for use in the frequency basis, comprising a frequency beamsplitter according to claim 1, wherein the frequency beamsplitter is a first frequency beamsplitter and operates in a first direction to split a beam of photonic qubits encoded in different frequency modes, an acousto-optic modulator driven to receive the outputs from the first frequency beamsplitter and couple the two different frequency and spatial modes of the outputs together via a phonon interaction to produce two further outputs, and provide the two further outputs to a second frequency beamsplitter, wherein the second frequency beamsplitter operates in a direction reverse to the first direction and produces a combined output.

10. A radio frequency half-wave plate according to claim 9, wherein the second frequency beamsplitter is physically discrete from the first frequency beamsplitter.

11. A radio frequency half-wave plate according to claim 9, wherein the second frequency beamsplitter and the first frequency beamsplitter are a single device capable of operating in both the first direction and the reverse direction, with the single device serving as the first frequency beamsplitter when operating in the first direction and as the second frequency beamsplitter when operating in the reverse direction.

* * * * *